United States Patent [19]

Piltingsrud et al.

[11] Patent Number: 4,596,739
[45] Date of Patent: Jun. 24, 1986

[54] RIGID MAGNETIC RECORDING MEDIA

[75] Inventors: Douglas H. Piltingsrud; John C. S. Shen, both of Rochester, Minn.

[73] Assignee: International Business Machines Corporation, Armonk, N.Y.

[21] Appl. No.: 700,249

[22] Filed: Feb. 11, 1985

[51] Int. Cl.[4] .............................................. G11B 5/70
[52] U.S. Cl. .............................. 428/315.9; 360/135; 252/62.54; 427/128; 428/315.5; 428/317.9; 428/425.9; 428/447; 428/694; 428/695; 428/900; 428/480; 428/524
[58] Field of Search .................... 428/694, 425.9, 695, 428/447, 900, 480, 524, 315.9, 315.5, 317.9; 427/131, 128; 360/135; 252/62.54

[56] References Cited

U.S. PATENT DOCUMENTS

| | | | |
|---|---|---|---|
| 4,368,237 | 1/1983 | Yamada | 428/900 |
| 4,397,751 | 8/1983 | Dichstein | 428/695 |
| 4,405,684 | 9/1983 | Blumentritt | 428/694 |
| 4,410,440 | 10/1983 | Ko | 428/900 |
| 4,536,451 | 8/1985 | Shen | 428/950 |
| 4,546,035 | 10/1985 | Ko | 428/315.9 |

FOREIGN PATENT DOCUMENTS 30606 6/1981 Japan ............................ 428/425.9

Primary Examiner—Ellis P. Robinson
Attorney, Agent, or Firm—Robert W. Lahtinen

[57] ABSTRACT

A rigid magnetic storage media coating composition using a high concentration of magnetic particles includes a dual thermoset binder system. The two polymers forming the dual binder system cure during mutually exclusive temperature ranges to form polymer networks that are interpenetrated and entangled. The thermoset polyurethane-melamine/polyester polymer binder system possesses improved properties including the ability to retain liquid fluorinated polyether lubricant without spin-off. The addition of a small amount of silicone wax to the uncured coating composition enhances composition rheology during spin coating on a rigid substrate.

13 Claims, 2 Drawing Figures

RIGID MAGNETIC RECORDING MEDIA

BACKGROUND OF THE INVENTION

This invention relates to magnetic recording media and more particularly to a thermoset polymer blend binder system for rigid magnetic storage media.

The increasing demands made on high performance magnetic recording media call for further improvements in the mechanical and electromagnetic properties of the recording media. As regards the mechanical properties of the media, the requirement to achieve long life and good service characteristics calls for increased tensile strength, superior abrasion resistance of the coating film and the ability to retain a liquid lubricant on the surface to reduce the head coefficient of friction during high speed recording. Improvement in electromagnetic properties require a binder system capable of dispersing magnetic particles uniformly with higher loading, coupled with the ability to provide acceptance of magnetic particle orientation in the desired direction under the influence of a magnetic field and to retain such particle orientation after curing the resin.

Orientation of the magnetic particles by the action of a magnetic field on the coating before it is dried improves the performance characteristics of the finished recording media by increasing the signal output and reducing the background noise level.

It is further necessary that the rigid magnetic coating binder system have the ability to produce a thinner coating, since the magnetic resolution is enhanced as the coating is made thinner.

All of these requirements: high tensile strength, superior wear resistance, high lub acceptance, low head friction, low head stiction, low lube spin-off, high magnetic particle orientation with high particle loading, uniform dispersion and thin as coated film thickness; require a unique polymer binder system. Presently available coating systems are unable to satisfy these conditions.

U.S. Pat. Nos. 4,268,556 and 4,156,052 disclose the importance of lubricant application to the rigid magnetic recording media to reduce head friction and wear. Various lubricants and methods are selected for this application. None of these prior art patents show or teach the microcellular structure in the base binder system to achieve these requirements. The use of polymer resin additives to improve the abrasion resistance of a magnetic coating is disclosed in U.S. Pat. No. 4,304,806 and the use of non-magnetic wear particles for such purpose is shown in U.S. Pat. No. 3,843,404. The present invention applies a thermoset polymer blend technique to produce a superior abrasion resistance film surface that pervades the entire macroscopic region rather than discrete areas.

Numerous publications show various dispersant combinations for magnetic recording coatings, including U.S. Pat. No. 4,049,566. The binders of this invention have their own dispersion power without the addition of dispersing agents.

Unlike the prior art, the present invention discloses a dual thermoset polymer system that results from a blending of two optimum thermoset polymer networks, processed in such a way that by physical entanglement rather than through chemical bonding, the final properties of the magnetic coating meets all desired requirements for a high performance, rigid magnetic recording media.

SUMMARY OF THE INVENTION

U.S. Pat. No. 4,405,684 shows a magnetic coating binder composition containing a blocked isocyanate, an epoxy resin, and a dispersant, with magnetic particles, surfactant, catalyst and solvents. This composition yields a very smooth disk coating but one low in surface microporosity. This results in a low surface lubricant absorption. In the present invention, the polyurethane magnetic binder system is modified by adding a mixture of hexamethoxy methyl melamine and polyester resins. The weight ratio of the mixture is in the range of 10 to 30 percent of total binder. The ratio of melamine to polyester is 3 to 7 parts by weight. The surface finishes resulting from each binder system shows approximately the same arithmetic average roughness, but the system modified by the addition of the melamine/polyester resin has about twice the lubricant retention capability. The difference in microstructure is the key to enhancing the lube retention.

The addition of melamine/polyester resin in the polyurethane coating system produces a matrix of two polymer networks after cure. During the cure process, the melamine resin is acting as a second cross-linker which reacts with the hydroxy polyester to form a first cross-linking network and the blocked isocyanate is de-blocked to interact with the epoxy to form a second network. Both crosslinked networks are incompatible, but interpenetrated through one another.

It was discovered by these inventors that the incompatibility of the two crosslinked polymers produces a special microscopic region that has the ability to retain the liquid fluorinated polyether lubricant without spin-off. While the entanglement of the two crosslinked polymers improves the strength of the coating. Under the cure temperature of 350° degrees F. or above, the melamine/polyester and isocyanate/epoxy both cross link simultaneously and independently with the resultant polymer networks interpenetrated and entangled. It is known in the art, that if two polymers are interpenetrated or entangled, the properties of the resultant coating is enhanced. The chemistry involved in these reactions is complicated; however, the technique represents a useful method for the modification of the lube retention property of a polyurethane magnetic coating while improving the physical and mechanical properties of the coating rather than sacrificing other magnetic coating properties as other methods have been found to do.

Unlike other coating applications, the spin coat process requires that a magnetic ink flow uniformly through a 3/8 inch diameter tubing at the flow rate of 6–10 cc per minute. In order to meet such a process requirement, the common technique was to dilute the coating with conventional solvents from an ink viscosity of 60–80 cps down to a range of 20–30 cps as measured by a Ferranti-Shirley viscosimeter at 1500 reciprocal seconds. This produces an ink with poor stability - magnetic particles separate from the binder. In this invention a silicone wax is added to improve the low flow rheology without diluting the entire coating. Using 1 to 5% of silicone wax additive in the coating binder system lubricates the spin coat process equipment during the circulation and therefore produces an excellent low flow property.

DETAILED DESCRIPTION

Figure 1:
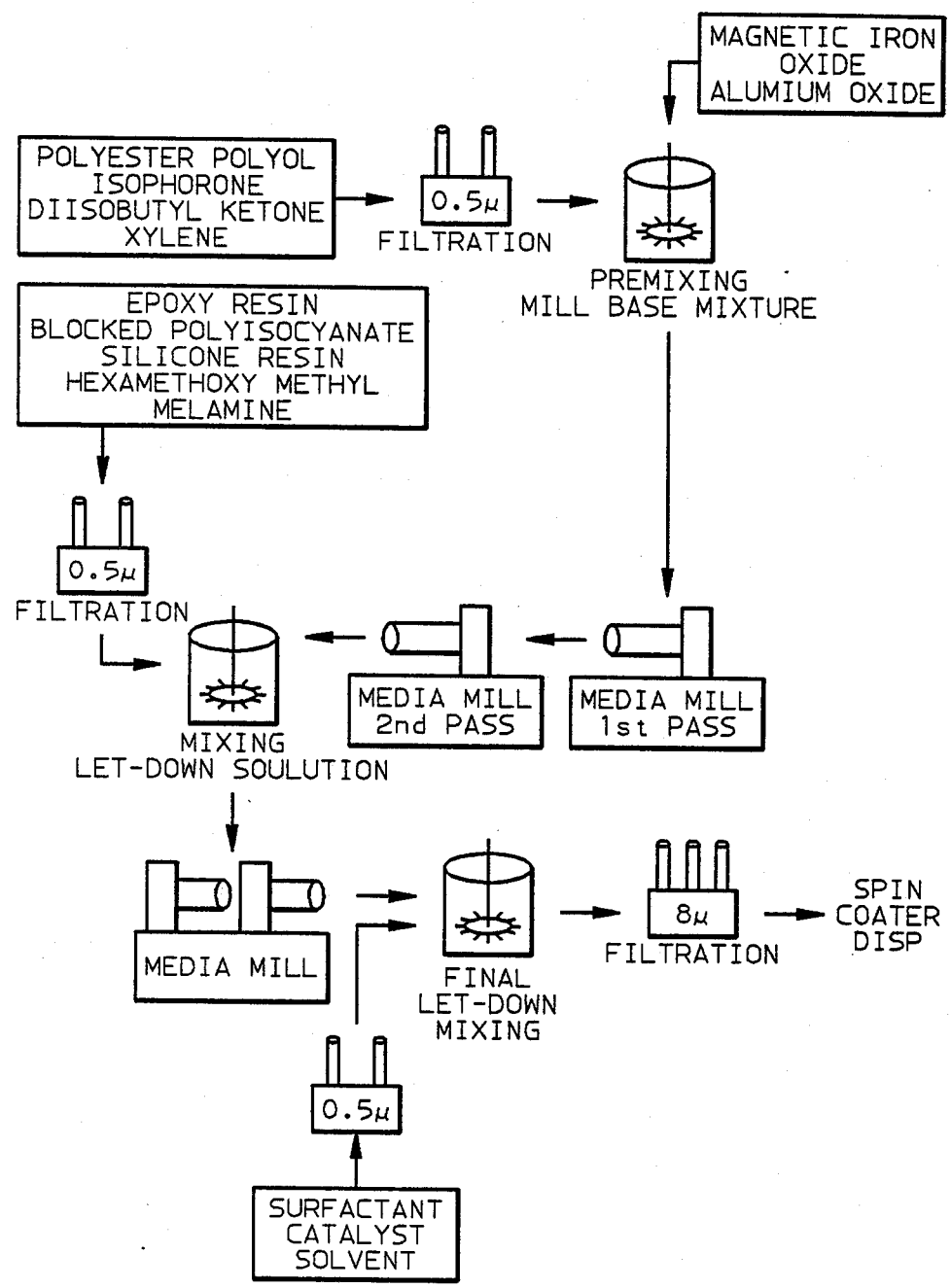
Figure 2:
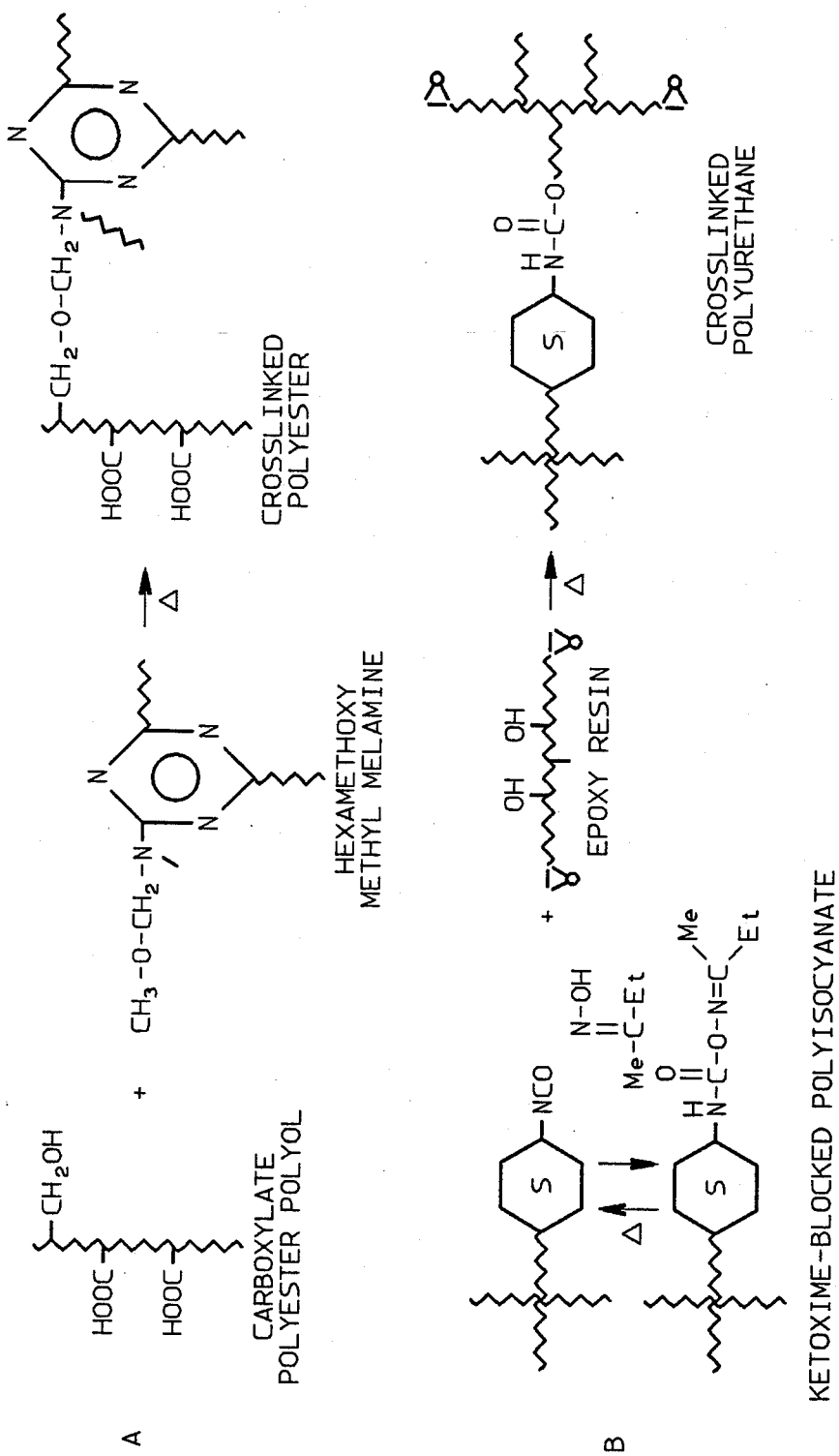

In accordance with this invention, a magnetic coating composition is provided which is adapted for use in coating hard file memory disks. This coating provides a magnetic recording surface which can be used substantially indefinitely without head crashing at a high recording speed (3600 rpm) and low fly height (less than 12 microinches) and can withstand long term repeated head loadings without loss of magnetic signals. The surface of this coating is exceptionally smooth after mechanical buffing (surface roughness of less than 0.4 microinches arithmetic average) and can retain a liquid lubricant without spin-off. This tough coating is very resistant to impact and solvents. The binder of this coating has excellent application and flow-out properties as well as good adhesion to aluminum substrates. The coating is especially well adapted to application by spin coating techniques and is capable of achieving coating thicknesses of less than one micron.

This binder solution contains a bisphenol-A epoxy having a secondary reactive hydroxyl group, a highly reactive blocked polyisocyanate, a hexamethoxy methyl melamine and a low molecular weight carboxylate polyester polyol having primary hydroxyl groups and a silicone/fluorochemical additive in a solvent mixture. A high concentration of magnetic oxides particles (over 70% by weight) is dispersed therein. The applied coating is cured by evaporating the solvents and heating the coated substrate to a temperature and for a time sufficient to cause interaction of the organic components of this coating.

Topologically speaking, the morphology of this coating depends on the relative rate of chemical interaction of each of the individual components and the compatibility of the solvent/resin system employed. For instance, optimum coating properties are achieved by the idealized stepwise reaction involved in the crosslinking reaction of the melamine cured with the carboxylate polyester polyol, followed by the blocked isocyanate being deblocked and thereafter reacting with the epoxy. This results in two cross linked polymer networks which can be visualized as being interpenetrating and entangling throughout the entire macroscopic sample.

The melamine resin useful in this invention is hexamethoxymethylmelamine having an average molecular weight within the range of 450 to 800. In general this resin will crosslink with primary hydroxyl group of carboxylate polyester polyol to form a first network structure. The reactivity of melamine resin is selected by its ability to inter-react only with the polyester, so that the undesirable chemical interactions between the secondary hydroxyl group of epoxy with melamine resin can be eliminated.

The carboxylate polyester polyol useful in this invention contains primary hydroxyl groups and carboxylate groups in the side chain and has an average molecular weight in the range of 1000 to 2000. The carboxylate group in the side chain of the polyester polyol provides the ability to disperse the magnetic oxide particles and to maintain both stability and uniformity of particle distribution throughout the entire solution. The amount of this resin is selected in such a way that it is compatible with other resin and will not cause undesirable gel formation. The primary hydroxyl group in this polyester provides the selective reactivity with only the melamine resin.

The ratio of melamine and carboxylate polyester polyol is critical. Excess of these resins will produce a chemical reaction with blocked isocyanate and/or epoxy resin and will result in final cellular structure changes and an inability to produce the properties required for disk applications. Too small a concentration will result in poor dispersion and poor stability of the entire solution. It is preferred that the weight fractional ratio of melamine to polyester be 3 to 7. When melamine and carboxylate polyester polyol are used, the addition of a dispersing agent in the coating system can be eliminated.

A conventional blocked isocyanate that contains aromatic, aliphatic or a combination aromatic/aliphitic hydrocarbon chains can be used in the invention, being only limited to the requirement that the isocyanate component be able to dissolve in melamine, polyester and epoxy resins and have a chemical reactivity only at temperatures above 250° degrees F. The compatibility of blocked isocyanates with melamine, polyester and epoxy in the resin solution is key to control of the cured crosslinked polymer networks interpenetration and entanglement. Control of chemical reactivity at the desirable cure conditions not only maintains the stability of the resin solution, but also eliminates undesirable chemical interaction between carboxylate polyester polyol and epoxy resin. Using blocked isocyanates in the coating requires a two-step reaction; first deblocking and then reacting with epoxy under the cure condition. This coating is designed in such a way that the melamine will react with polyester polyol before the blocked isocyanate deblocking to produce a two polymer network system. It is necessary to block the isocyanate group so that chemical interaction between the polyurethane and melamine/polyester can be eliminated. In other words, if melamine and polyester polyol reacts first, the isocyanates will react only with epoxy resin.

The blocked isocyanate components used in this invention have a molecular weight of 150 to 500 per blocked NCO group and further the blocked NCO group has at least three active sites per chain so that cross linking and thermosetting properties are established in the resulting polyurethane binder.

The epoxy resin used in this binder has an average molecular weight of 1000 to 5000 and contains only secondary hydroxyl groups. Preferably, the epoxy resin is a product of condensation of epichlorohydrin and bisphenol-A. The use of a secondary hydroxyl group of epoxy resin is to prevent chemical interaction with melamine resin.

The ratio of blocked isocyanate to epoxy is controlled in such a way that one weight part of the —NCO group of blocked isocyanate is reacted with one weight part of secondary —OH group from the epoxy resin.

Technically speaking, when the two crosslinked polymer networks are blended together, a characteristic cell structure should be exhibited where the first crosslinked network makes up the cell walls and the second crosslinked network provides the contents of the cells. The actual size of the cellular structures depends on the crosslinked density of the two network polymers varying from about 1000 to 500 angstroms. This variation by a factor of three depends upon the weight ratio of the components. It is preferred that the total weight of melamine/polyester is 25% of the total weight and the total weight of blocked isocyanate/epoxy is 75% of the binder system total weight.

This coating is especially well adapted to application by the spin coating technique. To achieve processability and to be able to obtain thin coatings, this coating further contains 1 to 5% by weight of silicone wax additive. Using silicone wax in this binder system lubricates the coating dispenser equipment of the coating system to produce better flow properties. The process is therefore easier to operate and is able to achieve a thinner coating without reducing the coating viscosity. Conventional ways of obtaining thinner coatings by diluting the binder solution with solvents often produces an ink with poor stability caused by magnetic particle sedimentation. Using the silicone wax as an additive in the binder system, the ink can be maintained at a higher viscosity and better ink stability results.

Several volatile type, nonreactive solvents can be used in the production of the present composition to reduce the solid content and enable the application of a thin coating on the substrate. However, those solvents that are compatible with resins increase the polymer-polymer interpenetrating and entanglement and therefore enhance the coating properties. The preferred solvent combination employed in the composition contains 70 parts by weight isophorone and 30 parts by weight xylene. It should be noted that the above solvent combination is not exclusive and that other nonreactive solvents may be employed.

The following are typical examples of the coating components and additives with the weight portions indicated exclusive of associated solvents. The solvent content shown unless otherwise indicated is the composite solvent concentration including the solvents associated with oligomers as received. Example I represents the preparation of mill base and Example II shows the composition of the let-down, while Example III includes the final let-down addition. The over-all composition ranges are shown in Example IV. Example V is the final disk coating properties. Referring to the Figure, the coating composition of Example I is prepared as follows:

The magnetic particle mixture is first prepared by adding 2000 parts of magnetic iron oxide particles and 30 parts of 0.8 micron size aluminum oxide particles to 220 parts of polyester resin solution, the polyester resin solution is a mixture of 75 parts of hydroxyl carboxylate polyester polyol with 25 parts cellosolve acetate solvent, and a portion of the solvents including 1000 parts isophorone, 190 parts diisobutyl ketone and 160 parts xylene. The mixture is stirred for a period of 1 to 2 hours. The entire mixture is milled using conventional milling techniques such as ball mill or media mill until free of aggolmerates approximately 36–45 minutes cavity residence time for media milling.

| MILL BASE MIXTURE | parts by weight |
|---|---|
| magnetic iron oxide particles | 2000 |
| 0.8 micron aluminum oxide particles | 30 |
| polyester polyol in cellosolve acetate | 220 |
| isophorone | 1000 |
| diisobutyl ketone | 190 |
| xylene | 160 |

Example II is the let-down solution preparation. The mixture containing 1200 parts of 40% epoxy resin in isophorone solvent with 770 parts of 42% ketoxime-blocked polyisocyante/isocyanurate copolymer in 70/30 cellosolve acetate/xylene solvent, 70 parts of hexamethoxy methyl melamine and 70 parts of 30% silicone polymer in xylene. The whole mixture is stirred for a period of 1 to 2 hours and filtrated through a 0.6 micron absolute size filter to remove any contaminations or insoluble material. Thereafter, the solution is mixed with mill base and the entire mixture is milled for a cavity residence time of 12–20 minutes.

| LET-DOWN SOLUTION | parts by weight |
|---|---|
| epoxy resin 40% in isophorone | 1200 |
| 42% ketoxime-blocked polyisocyanate/isocyanurate copolymer | 770 |
| silicone resin 30% in xylene | 70 |
| hexamethoxy methyl melamine | 70 |

Example III is the coating composition for final addition, this includes a flurocarbon surfactant in the amount of 0.4 parts and the solvents to adjust the final viscosity. The preferred diluting solvent is a 70/30 mixture of isophorone and xylene repectively.

| FINAL LET-DOWN | part by weight |
|---|---|
| flurocarbon surfactant | 0.4 |
| isophorone/xylene | 200 |

The final let-down solution is added slowly into the entire mixture, the ink is then filtrated through a 8 micron absolute filter which is approximately 2 micron nominal size, to remove any undispersed materials.

The Example IV shows the ranges of composition used in this invention.

| COATING COMPOSITION | parts by weight |
|---|---|
| 1. mill base | |
| magnetic iron oxide particles | 1200–2500 |
| aluminum oxide particles | 0–75 |
| 75% polyester polyol in cellosolve acetate | 150–400 |
| isophorone | 800–2000 |
| diisobutyl | 150–350 |
| xylene | 140–330 |
| 2. let-down solution | |
| 40% epoxy resin in isophorone | 800–1500 |
| 42% ketoxime-blocked polyisocyanate/isocyanurate copolymer in 70/30 cellosolve acetate and xylene | 500–1500 |
| silicone resin 30% in xylene | 50–100 |
| hexamethoxy methyl melamine | 50–150 |
| 3. final let-down | |
| flurocarbon surfactant | 0.25–1.0 |
| catalysts | 0–3.0 |
| solvents | 100–1000 |

Example V shows the final disk coating properties:

| coating properties | | |
|---|---|---|
| ink storage stability | 6 | months |
| coating hardness | 6 | H |
| film tensile strength | 6500 | psi |
| coating thickness applied | 20–30 | microinches |
| coating thickness final | 15–20 | microinches |
| orientation ratio | 3–4 | |
| surface roughness in AA | 0.2–0.4 | microinch |
| peak to valley | 1.0–3.0 | microinch |
| lube retention | 1.0–0.03 | mg/cm$^2$ |
| durability start/stop cycle | >40,000 | cycles |
| head stiction | <20 | grams load |

On a disk thus prepared, an 8 MHz (megahertz) signal was recorded using a thin film head with a E5 MH (Mellzamp) recording current and a 3200 rpm rotatinal speed. The reproduction output was 500–600 microvolt at the outer periphery. The disk has a recording capacity of 120–150 megbyes per surface and area density of 20–28 megbits per square inch.

What is claimed is:

1. A rigid magnetic recording medium having finely divided magnetic particles dispersed in a thermosetting resin binder composition applied as a thn film, having an ultimate cured thickness less than 2 microns and closely adhered to a non-magnetic substrate, wherein the coating composition includes 50 to 80 weight percent of magnetic particles and 20 to 50 weight percent of binder, said binder comprising:
    40 to 50 weight percent bisphenol-A epoxy,
    30 to 40 weight percent blocked polyisocyanate having a molecular weight of 150 to 500 per NCO group,
    10 to 20 weight percent hydroxyl carboxylate polyester.
    a weight percent of m elamine resin that is 33 to 54 percent of the weight percent of hydroxyl carboxylate polyester, and
    1 to 5 weight percent additives,
    said coating composition being cured to form a dual binder system with a crosslinked polyurethane interpenetrated by a crosslinked melamine polyester with porosity existing therebetween.

2. The binder composition of claim 1 wherein said additives include 1 to 5 per cent by weight of silicone wax additive.

3. The binder composition of claim 1 wherein said melamine resin is hexamethoxymethylmelamine with an average molecular weight in the range of 450 to 800.

4. The binder composition of claim 3 wherein said carboxylate polyester contains a primary hydroxyl group, a carboxylate group in the side chain and has an average molecular weight in the range of 1000 to 2000.

5. The binder composition of claim 4 wherein said blocked isocyanate is selected from the group that contains aromatic, aliphatic or a combination of aromatic-/aliphatic hydrocarbon chains and is soluable in melamine, polyester and epoxy resins.

6. The binder composition of claim 5 wherein said epoxy resin is selected from the group of bisphenol-A-epoxys which contain only secondary hydroxy groups and have an average molecular weight in the range of 1000 to 5000.

7. The binder composition of claim 5 wherein said additives include 1 to 5 per cent by weight of silicone wax additive.

8. A rigid magnetic recording medium having finely divided magnetic particles dispersed in a thermosetting resin binder composition applied as a thin film, having an ultimate cured thickness less than 2 microns and closely adhered to a non-magnetic substrate, wherein the coating composition includes 50 to 80 weight percent magnetic particles and 20 and 50 weight percent of a cured interpenetrated dual binder, said binder system comprising 50 to 80 weight percent thermoset polyurethane polymer formed from a blocked isocyanate having a molecular weight of 150 to 500 per NCO reactive site and interpenetrated by 50 to 20 weight percent thermoset melamine/polyester polymer wherein the weight of the melamine component is 33 to 54 percent of the weight of the polyester components, with porosity existing between the interpenetrated polymers whereby the capability of the magnetic coating medium surface to absorb and retain liquid lubricant is enhanced.

9. The rigid magnetic recording medium of claim 8 wherein said binder comprises substantially 75 weight per cent thermoset polyurethane polymer and 25 weight per cent melamine/polyester polymer.

10. The rigid magnetic recording medium of claim 8 wherein said thermoset melamine/polyester polymer is the reaction product 25 to 35 weight per cent hexamethoxymethylmelamine and 75 to 65 weight per cent carboxylate polyester polyol.

11. The rigid magnetic recording medium of claim 8 wherein said thermoset polyurethane polymer is the reaction product of blocked polyisocyanate and bisphenol-A epoxy wherein the NCO/OH equivalent weight ratio is in the range from 0.9 to 1.1.

12. The rigid magnetic recording medium of claim 8 wherein said binder further comprises 1 to 5 weight per cent silicone wax additive in the total binder system.

13. A rigid magnetic recording medium having finely divided magnetic particles dispersed in a thermosetting polymer binder composition applied as a thin film, having an ultimate cured thickness less than 2 microns and closely adhered to a non-magnetic substrate, wherein the coating composition includes 50 to 80 weight percent magnetic particles and 19 to 49 weight percent binder, said binder system comprising a highly entangled or interpenetrated dual thermoset polymer binder system of crosslinked ppolyurethane and crosslinked melamine/polyester polymers with porosity created between the interpenetrated polymers that provides for absorption and retention of liquid lubricant, and 1 to 5 weight percent silicone wax additive in the total binder system.

* * * * *